US007032101B2

(12) United States Patent
Gschwind et al.

(10) Patent No.: US 7,032,101 B2
(45) Date of Patent: Apr. 18, 2006

(54) METHOD AND APPARATUS FOR PRIORITIZED INSTRUCTION ISSUE QUEUE IN A PROCESSOR

(75) Inventors: Michael Karl Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/085,606

(22) Filed: Feb. 26, 2002

(65) Prior Publication Data

US 2003/0163671 A1 Aug. 28, 2003

(51) Int. Cl.
*G06F 9/40* (2006.01)
(52) U.S. Cl. .................. 712/214; 712/3; 712/207
(58) Field of Classification Search ............. 712/214, 712/215, 207, 234, 237, 238, 2, 3
See application file for complete search history.

(56) References Cited

U.S. PATENT DOCUMENTS

| 4,829,425 | A | * | 5/1989 | Bain et al. ............. 711/202 |
|---|---|---|---|---|
| 5,655,114 | A | * | 8/1997 | Taniai et al. ........... 712/233 |
| 5,864,341 | A | | 1/1999 | Hicks et al. ............ 395/390 |
| 5,890,008 | A | * | 3/1999 | Panwar et al. .......... 712/15 |
| 6,154,826 | A | * | 11/2000 | Wulf et al. ............ 711/217 |
| 6,594,730 | B1 | * | 7/2003 | Hum et al. ............. 711/137 |
| 2002/0062435 | A1 | * | 5/2002 | Nemirovsky et al. ...... 712/7 |

OTHER PUBLICATIONS

Graf, Rudolf F, Modern Dictionary of Electronics, 1988, Sixth Edition, pp. 498-499.*

Hennessy and Patterson, Computer Architecture A Quantitative Approach, 1996, Morgan Kaufman Publishers, Second Edition, pp. 402 and 403.*
C. Zilles and G. Sohi "Understanding the Backward Slices of Performance Degrading Instructions", Proc. of the International Symposium on Computer Architecture, 2000. pp: 172-181.
K. Ebcioglu, et al "Optimizations and Oracle Parallelism with Dynamic Translation", Proc. of the 32nd International Symposium on Microarchitecture, 1999. pp.: 284-295.
S. Abraham, et al, "Predictability of Load/Store Instruction Latencies", Proc. of the 26th International Symposium on Microarchitecture, 1993. pp.: 139-152.
M. Annavaram, et al "Data Prefetching by Dependence Graph Precomputation", Proc. of the International Symposium on Computer Architecture, 2001. pp.: 52-61.
S. Srinivasan et al, "Locality vs. Criticality", Proc. of the International Symposium on Computer Architecture, 2001,. pp.: 132-143.

* cited by examiner

*Primary Examiner*—William M. Treat
*Assistant Examiner*—Tonia L. Meonske
(74) *Attorney, Agent, or Firm*—George Sai-Halasz (57) ABSTRACT

An apparatus and method in a high performance processor for issuing instructions, comprising; a classification logic for sorting instructions in a number of priority categories, a plurality of instruction queues storing the instruction of differing priorities, and a issue logic selecting from which queue to dispatch instructions for execution. This apparatus and method can be implemented in both in-order, and out-of-order execution processor architectures. The invention also involves instruction cloning, and use of various predictive techniques.

23 Claims, 5 Drawing Sheets

METHOD AND APPARATUS FOR PRIORITIZED INSTRUCTION ISSUE QUEUE IN A PROCESSOR

FIELD OF THE INVENTION

This invention relates to an apparatus, and a method, for issuing instructions in a high performance processor. More specifically, it introduces a classification logic to sort instructions in priority relative to each other, and to store such prioritized instruction in multiple instruction queues. An enhanced dispatch logic, cognizant of the priority categories directs the instruction execution. The scheme can be combined with various predictive techniques involving hardware, software, or their combination.

BACKGROUND OF THE INVENTION

Contemporary high-performance rely on superscalar, super-pipelining, and/or very long instruction word (VLIW) techniques for exploiting instruction-level parallelism in programs; that is, for executing more than one instruction at a time. In general, these processors contain multiple functional units, execute a sequential stream of instructions, are able to fetch from memory more than one instruction per cycle, and are able to dispatch for execution more than one instruction per cycle subject to dependencies and availability of resources.

The pool of instructions from which the processor selects those that are dispatched at a given point in time is enlarged by the use of out-of-order execution. Out-of-order execution is a technique by which the operations in a sequential stream of instructions are reordered so that operations appearing later are executed earlier if the resources required by the operation are free, thus reducing the overall execution time of a program. Out-of-order execution exploits the availability of the multiple functional units by using resources otherwise idle. Reordering the execution of operations requires reordering the results produced by those operations, so that the functional behavior of the program is the same as what would be obtained if the instructions were executed in the original sequential order.

The efficiency of out-of-order issuing strategies depends to a large degree on the number of instructions which are available and ready to be issued. Thus, the likelihood of exploiting the available execution resources of the different functional units is highest when a large number of instructions are ready. To enlarge the pool of ready instructions state-of-the-art processors use several predictive and prefetching techniques, such as branch prediction, branch target prediction, caching and prefetching techniques, value prediction, store-load bypassing etc.

Predictive techniques involve hardware, software, or a combination of both. Hardware parts of such implementations are usually referred to as predictor units. These typically comprise at least one history table capturing events of the execution characteristics of program, logic to determine a likely future event (i.e., make a prediction) based on the execution history stored in said history table, and a trigger which causes a prediction to be made. Triggers can include, but are not limited to, e.g., a tag match circuit to determine whether one or more bits in the program counter match one or more bits of at least one tag stored in a history table, or a decode circuit to determine if a prediction should be made based on instruction type, such as performing a branch prediction when a branch is encountered.

Software implementations of predictive techniques are usually implemented in the compiler based on execution profiles collected during sample executions of a program. The compiler then uses this execution information to guide optimizations, and to adapt the program code by selecting different optimizations.

In a hybrid hardware/software scheme, the compiler annotates the program with information about the program behavior, e.g., branch prediction outcomes can be communicated with branch instructions such as "branch with high probability", "branch with low probability", or "branch with unknown/hard-to-predict probability". During execution the processor can then use these annotations to guide instruction execution.

While these techniques have generally been very successful in increasing the instruction level parallelism (ILP) which can be extracted from programs, programs still achieve only a fraction of their peak instruction throughput on typical programs. This is due to performance degrading events, such as branch mispredictions and cache misses. Performance degrading are concentrated in a small number of static instructions which are not amenable to the current branch prediction and caching strategies.

In "Optimizations and Oracle Parallelism with Dynamic Translation", Proc. of the 32nd International Symposium on Microarchitecture, November 1999, Ebcioglu, et al evaluate the performance potential of microprocessors when perfect prediction is available.ABRaham, et al, "Predictability of Load/Store Instruction Latencies", Proc. of the 26th International Symposium on Microarchitecture, December 1993, demonstrates that a fraction of static instructions are responsible for the majority of cache misses. Zilles and Sohi analyze the instructions which lead up to performance degrading events in "Understanding the Backward Slices of Performance Degrading Instructions", Proc. of the International Symposium on Computer Architecture, 2000.

The problems of efficient program execution are known in the computer architecture arts and there is a sizable scientific and patent literature dealing with such issues. A sampling of relevant related art in reducing the impact of performance degrading operations is now set forth.

The article by Annavaram, et al "Data Prefetching by Dependence Graph Precomputation", Proc. of the International Symposium on Computer Architecture, 2001, describes the prefetching of data into a cache by exploiting address precomputation. To identify accurately the addresses of data which should be prefetched, the authors describe the computation of the dependence graph of the address generation.

Srinivasan et al, "Locality vs. Criticality", Proc. of the International Symposium on Computer Architecture, 2001, attempts to reduce effective cache miss penalty by identifying performance-critical load instructions and maintain them in a special cache to reduce latency which cannot be covered by instruction scheduling.

U.S. Pat. No. 5,864,341 entitled "Instruction dispatch unit and method for dynamically classifying and issuing instructions to execution units with non-uniform forwarding" issued on 15 Jan. 26, 1999 to Hicks et al. describes an apparatus for dynamically classifying and issuing instructions to execution units with non-uniform forwarding. According to this invention, instructions are maintained in a single issue queue, but classified into "buckets" corresponding to different sets of functional units to which instructions can be issued. The apparatus described thus allows to classify operations in terms of different functional units to which they can be issued, and prioritize issuing of instructions when multiple buckets can issue to the same functional units.

Presently known techniques, as the above cited sampling shows, none address the full range problems associated with efficient execution of workloads, and none teaches the present invention. For instance, U.S. Pat. No. 5,864,341 classifies instructions, but in that scheme instructions cannot be classified in terms of their priority relative to each other, to ensure that high-priority instructions (e.g., such instructions leading up to a performance degrading event) are issued before lower-priority instructions. Most proposed implementations require significant amounts of hardware to pre-execute the address computations in specialized pre-execution hardware while already available execution resources may be idle. Such solution also dissipate unnecessary amounts of power. Many branch prediction schemes address the issue of performance degrading events by increasing the amount of resources applied to the problem. This results in more complex hardware which requires additional area, and more design and validation resources while it is not clear that they will be sufficiently successful in reducing the impact of performance degrading events. Accordingly, it follows that increasing the resources devoted to probabilistic components of caches and branch predictors is insufficient to solve the issue of performance degrading events sufficiently. Also, while pre-execution addresses these issues, current solutions based on using separate pre-execution function units, or the use of multithreading capabilities to speculatively assist a main execution thread are overly expensive. What is needed is a method to reduce the impact of performance-degrading events by pre-executing their backward slices without incurring substantial hardware and execution time overhead.

SUMMARY OF THE INVENTION

The problems stated above and the related problems of the prior art are solved with the principles of the present invention, the object of which is an apparatus and method for a prioritized issue queue design in a processor.

A computer processing system stores sequences of instructions in a memory for execution by a processor unit. When instructions are fetched, they are decoded and the decoded results stored in an issue queue until the instruction is ready to be scheduled, i.e., its input operands have been computed and the appropriate functional unit(s) is available.

The present invention teaches a method and corresponding apparatus that performs instruction classification to identify critical instructions which should be executed early, e.g., backward slices of instructions causing performance degrading events, and store instructions in a plurality of issue queues. These issue queues can are associated with different priority levels for execution by the issue logic. Thus, when the issue logic issues instructions in a given cycle, it will give priority to instructions stored in one issue queue over instructions contained in one or more other issue queues.

Classification can be based on a variety of criteria, e.g.,
1. Whether an instruction is a speculative prefetch operation,
2. Whether an instruction is part of the dependence graph (backward slice) of an instruction which may cause a performance degrading event, e.g., a memory instruction which may miss in the cache, or a branch which may be mispredicted,
3. Whether an instruction is part of the dependence graph (backward slice) of a memory instruction which may miss in the case and which is performance critical,
4. Whether an instruction is a scalar or multimedia-vector (SIMD) instruction.

Those skilled in the art will recognize that this list is non-exhaustive, and other criteria can be used, as well, in the spirit of the present invention.

This invention can be used in conjunction with in-order and out-of-order processor implementations.

In in-order processors, instructions in only one issue queue may commit state changes, whereas other issue queues can be used to speculatively pre-compute values, and assist in branch prediction, cache prefetching, etc.

In out-of-order processors, instructions from all issue queues may commit state changes, and appropriate in-order semantics will be preserved by the out-of-order processor's commitment logic.

BRIEF DESCRIPTION OF THE DRAWINGS

These and other features of the present invention will become apparent from the accompanying detailed description and drawings.

DETAILED DESCRIPTION OF THE INVENTION

Figure 1:
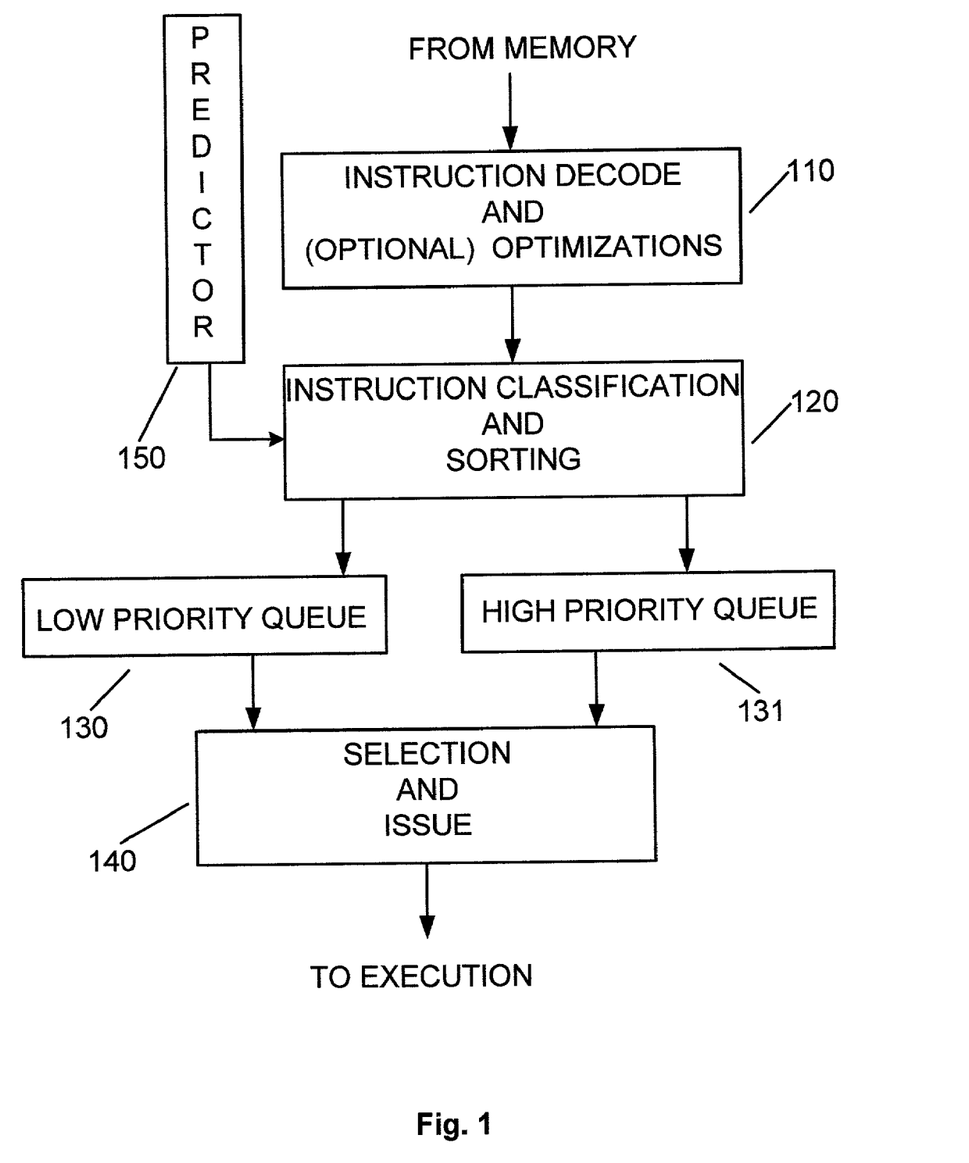
FIG. 1. Shows a prioritized issue queue apparatus.

FIG. 1 shows a prioritized issue queue apparatus. In processors instructions are usually stored in memory from where they enter unit 110 instruction decode. Instructions here are decoded and optionally may be optimized with microarchitectural techniques, such as microcode expansion, register renaming, etc. The decoded instructions as passed on the classification and sorting logic 120. Here the instructions are classified and sorted to be stored in one of a plurality of issue queues. Classification can be based on a variety of factors, using novel or established classification criteria, e.g.,
1. Whether an instruction is part of the dependence graph (backward slice) of an instruction which may cause a performance degrading event, e.g., a memory instruction which may miss in the cache, or a branch which may be mispredicted, e.g., using a classification criterion based on the work by Annavaram et al., op. cit.
2. Whether an instruction is part of the dependence graph (backward slice) of a memory instruction which may miss in the case and which is performance critical, e.g., using a classification criterion based on the work by Srinivasan et al., op. cit.
3. Whether an instruction is a scalar or multimedia-vector SIMD instruction.

The instructions which in the classification logic have been prioritized in importance relative to each other and sorted in a number (at least two) of priority categories are stored in a plurality (at least two) instruction queues. The plurality of issue queues matches, or equals, the number of priority categories. In FIG. 1 two issue queues are shown a low priority 130 and a high priority 131. In this embodiment the instructions are being sorted into two priority categories, a low one and a high one. The number two of the queues should not be regarded as a limitation, on other embodiments several more queues and instruction priority categories are possible. Also, the number of queues is a computer architectural term. It means the queues with differing priority. Although in most cases the actual hardware storage places, where ready to execute instructions are stored, are indeed equaling the number of differing priority queues, but this need not be necessarily so. The way the hardware is realized it may have storage elements in many forms and many physical locations. This would make no difference for the present invention dealing with the number of architected queues.

A selection and issue logic 140 operably coupled to the plurality of instruction queues, in FIG. 1 showing only two 130 and 131, decides which instruction from the plurality of queues to be despatched for execution. The selection and issue logic 140 is different than prior art issue logics since it has been designed to be cognizant of the priority categories of the plurality of instruction queues.

In another embodiment one can make use of prediction techniques to identify performance-critical instructions. Such a unit 150 is shown to operably couple to the classification logic 120. As discussed earlier predictive techniques involve hardware, software, or a combination of both. Purely hardware implementation of prediction techniques are used typically during run, or execution time of programs. For embodiments where software is involved in predictions it is base on the compiler. With the combined use of software and hardware, identification of critical instructions begins at compilation time. Based on sample pre-executions of a program the compiler annotates some of the instructions indicating priority categories. This information is stored in the instructions in memory, and is used by the classification logic 120 during program execution.

The a prioritized issue queue apparatus and method can be implemented in either in-order, or out-or-order execution computer architectures.

Figure 2:
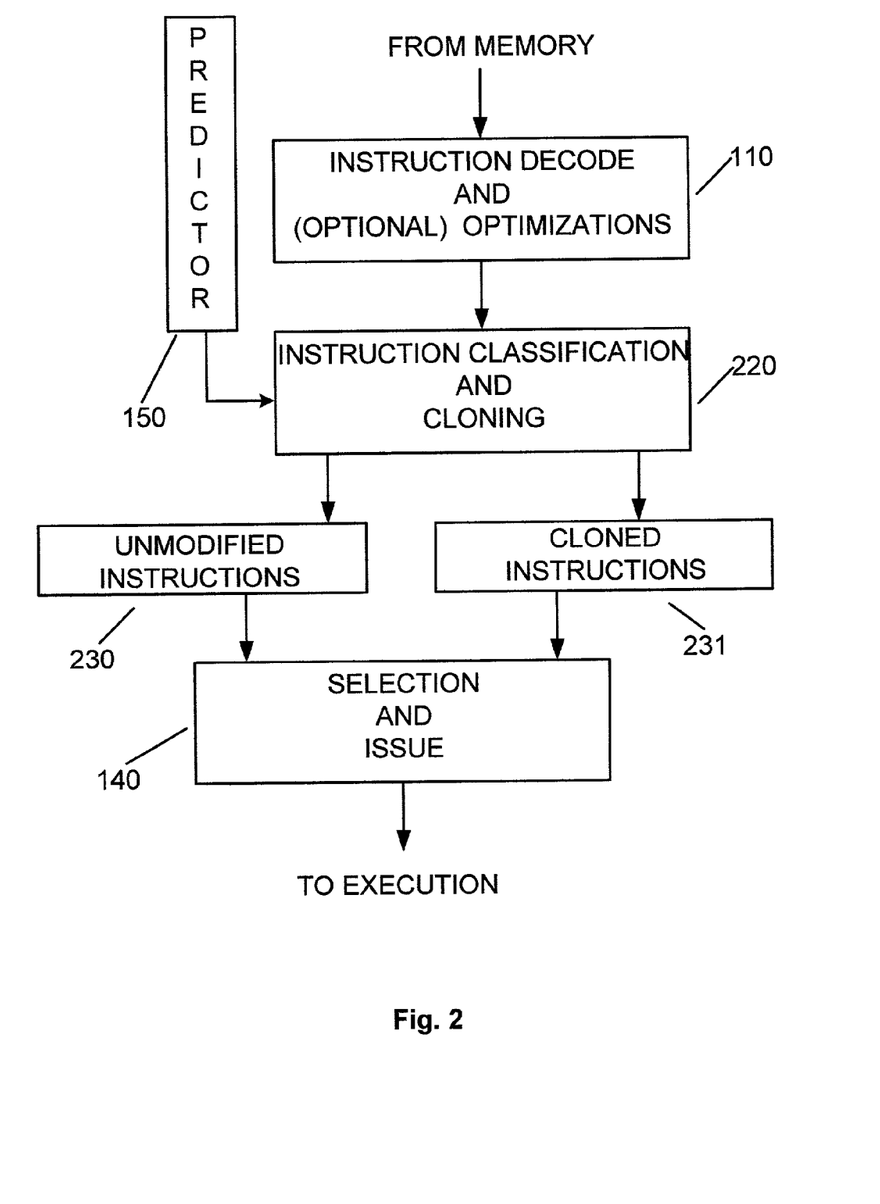
FIG. 2. Shows a prioritized issue queue apparatus involving instruction cloning.

FIG. 2 shows a prioritized issue queue apparatus involving instruction cloning. Cloning of instruction in this invention means creating an instruction, the so called cloned instruction, from another instruction in the program, typically a critical one. The cloned instruction if executed ahead of the unmodified instruction, from which it was created, it serves useful information to avoid the potential problems with the unmodified instruction. For example, a memory instruction can be cloned to generate a prefetch instruction to ensure the availability of data in the cache when the instruction executes.

FIG. 2 shows the same elements as FIG. 1 except for the those involved with cloning. Instructions are decoded in a decode unit 110. Optionally instructions are subjected to microarchitectural techniques, such as microcode expansion, register renaming, etc. In the classification logic 220, instructions are analyzed in order to determine if any should be cloned. In one embodiment, instructions corresponding to high-latency memory operations are cloned, generated two instructions, a first instruction corresponding to a high-priority prefetch instruction, and a second instruction corresponding to the original memory access instruction. If a memory instruction is to be cloned, the prefetch instruction is stored in the high-priority issue queue 231. The originally fetched, (optionally) expanded, (optionally) renamed memory instructions instruction are stored in the low priority issue queue 230. It is clear for those skilled in the art that other cloning criteria can be used, and that instruction cloning can be used in a variety of ways in conjunction with instruction classification according to FIG. 1.

In one alternative embodiment, cloned instructions, for instance, prefetch instructions, can be stored in a low-priority queue to execute only when memory bandwidth is available. In particular, this may depend on the ratio of cloned and uncloned instructions. If this ratio is high, i.e., many instructions are cloned, the cloned issue queue is defined to be lower priority to ensure that the execution pipelines are not saturated with prefetch traffic and prevented from executing actual workload instructions.

The determination of priorities can be performed either statically at design time, or dynamically during execution time based on the observed ratios.

The present invention preferably has logic to purge the issue queue 231 of instructions which are older than the oldest instruction in the unmodified issue queue 230, and a mechanism to prevent a full prefetch issue queue from stalling the whole operation of the disclosed apparatus for issuing instructions.

While this embodiment has been described in terms of an in-order architecture, it should be obvious to those skilled in the art that the present invention can also be practiced in out-of-order embodiments.

It should be evident to those skilled in the art that this embodiment can be combined with predictive techniques. In one such optimized embodiment, a predictor unit 150 is used to select a subset of memory operations for which to prefetch, e.g., based on the prediction of likelihood of missing in a cache, or on prediction of the performance-degrading effect of missing in the cache. In a software-based predictive scheme, prefetch instructions are inserted according to prior art and the static selection logic steers prefetch instructions to a queue of a high priority 231, and all other instructions to a queue of a second, lower priority 230. In a hybrid hardware/software predictive scheme, memory operations are identified by the compiler (or linker, or a special purpose tool, or any other tool of the program development environment) as being subject to prefetch or not, e.g., by a single bit in the instruction word. Memory operations which are so identified are cloned and a prefetch operation is entered into a first queue 231, other instructions being entered in a second queue 230.

Purely hardware implementation of prediction techniques are used typically during run, or execution time of programs. With the combined use of software and hardware, identification of critical instruction occurs already at compilation time.

Descriptions have been made referring to a first and a second queue, representing a first and a second priority. It should be evident that the teachings can be applied to systems having more than two queues, the additional queues corresponding to a third, fourth, fifth, . . . priority.

Figure 3:
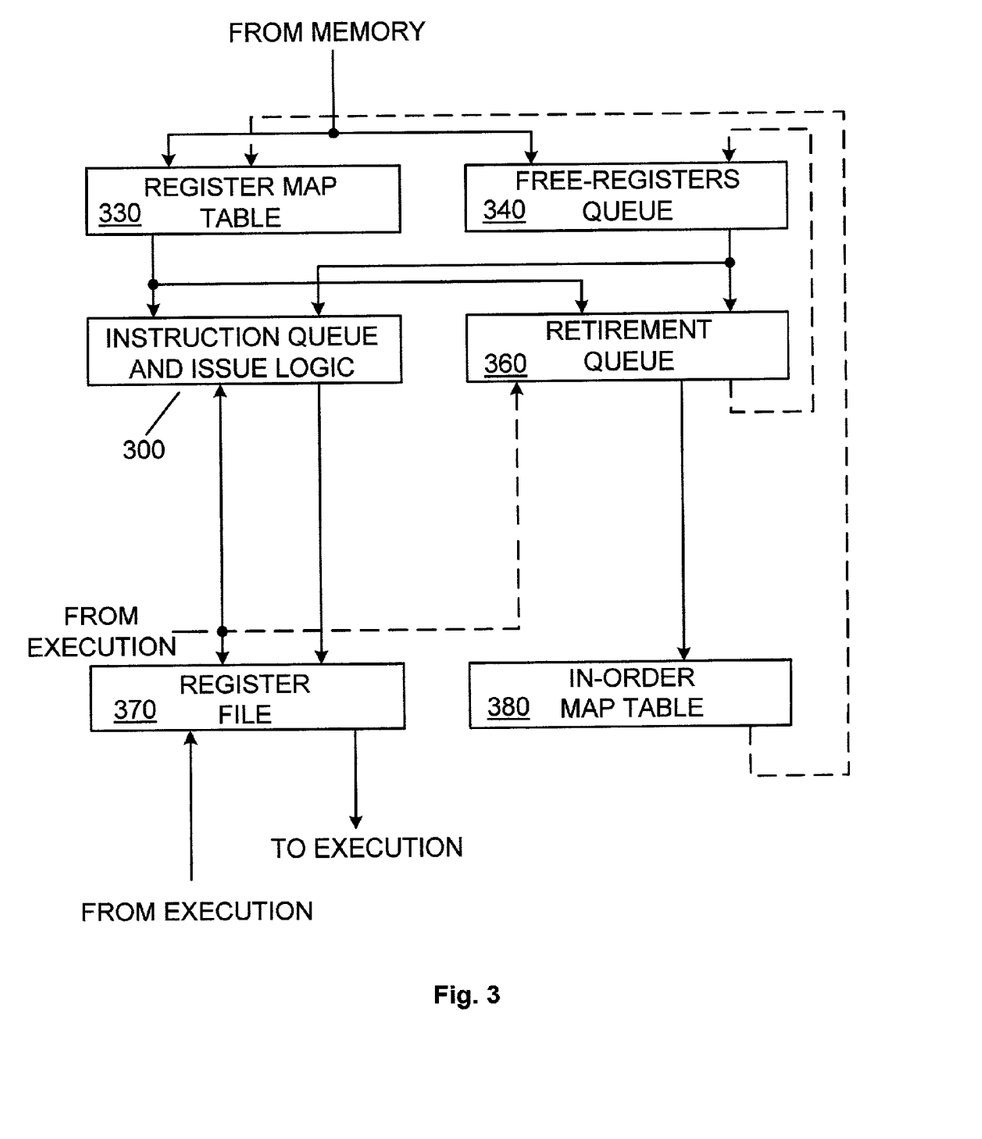
FIG. 3. Shows the instruction issuing portion of a prior art out-of-order issue processor.

A further embodiment of the present invention is given for the case of an out-of-order execution processor where critical instructions, and their backward slices, are issued from a high priority issue queue. FIG. 3 shows the instruction issuing portion of a prior art out-of-order issue processor. This part of the processor is where an embodiment of the present invention is applicable.

The implementation of a processor capable of dynamically scheduling instructions (an out-of-order issue processor) includes the following features:
1. A mechanism for issuing instructions out-of-order, including the ability to detect dependencies among the instructions, rename the registers used by an instruction, and detect the availability of the resources used by an instruction.
2. A mechanism for maintaining the out-of-order state of the processor, which reflects the effects of instructions as they are executed (out-of-order).
3. A mechanism for retiring instructions in program order, simultaneously updating the in-order state with the effects of the instruction being retired.
4. A mechanism for retiring an instruction in program order without updating the in-order state (effectively canceling the effects of the instruction being retired), and for resuming in-order execution of the program starting at the instruction being retired (which implies canceling all the effects present in the out-of-order state). Mechanism 3 from the list above is used to retire instructions when the effects of the instruction being retired are correct. Mechanism 4 is used instead, whenever there is some abnormal condition resulting from the execution of the instruction being retired or from some external event.

The instruction issuing portion of a prior art out-of-order issue processor are illustrated schematically on FIG. 3. A register file 370; a register map table 330; a free-registers queue 340; an instruction queue and issue logic 300; a retirement queue 360; and an in-order map table 380. This illustrative organization is based on the one described by M. Moudgill et al, in "Register renaming and dynamic speculation: an alternative approach", in Proceedings of the 26th Annual International Symposium on Microarchitecture, pp. 202–213, December 1993. In the processor of FIG. 3, the architected registers names used by the instructions for specifying the operands are renamed according to the contents of the register map table 330, which specifies the current mapping from architected register names to physical registers. The architected registers names used by the instructions for specifying the destinations for the results are assigned physical registers extracted from the free-register queue 340, which contains the names of physical registers not currently being used by the processor. The register map table 330 is updated with the assignments of physical registers to the architected destination register names specified by the instructions. Instructions with all their registers renamed are placed in the instruction queue controlled by the issue logic 300; instructions are also placed in the retirement queue 360, in program order, including their addresses, their physical and their architected register names. Instructions are dispatched from the instruction queue 300 when all the resources used by the instructions are available (physical registers have been assigned the expected operands, and functional units are free). The operands used by the instruction are read from the register file 370, which typically includes general-purpose registers (GPRs), floating-point registers (FPRs), and Condition Registers (CRs). Instructions are executed, potentially out-of-order, in execution units (not shown). Upon completion of execution, the results from the instructions are placed in the register file 370. Instructions in the instruction queue 300 waiting for the physical registers set by the instructions completing execution are notified. The retirement queue 360 is notified of the instructions completing execution, including whether they raised any exceptions. Completed instructions are removed from the retirement queue 360, in program order (from the head of the queue). At retirement time, if no exceptions were raised by an instruction, the in-order map table 380 is updated so that architected register names point to the physical registers in the register file 370 containing the results from the instruction being retired; the previous register names from the in-order map table 380 are returned to the free-registers queue 340. On the other hand, if an instruction has raised an exception, program control is set to the address of the instruction being retired from the retirement queue 360; the retirement queue 360 is cleared (flushed), thus canceling all unretired instructions; the register map table 330 is set to the contents of the in-order map table 380; and any register not in the in-order map table 380 is added to the free-registers queue 340. In addition to the components above, superscalar processors may contain other components such as branch-history tables to predict the outcome of branches.

Figure 4:
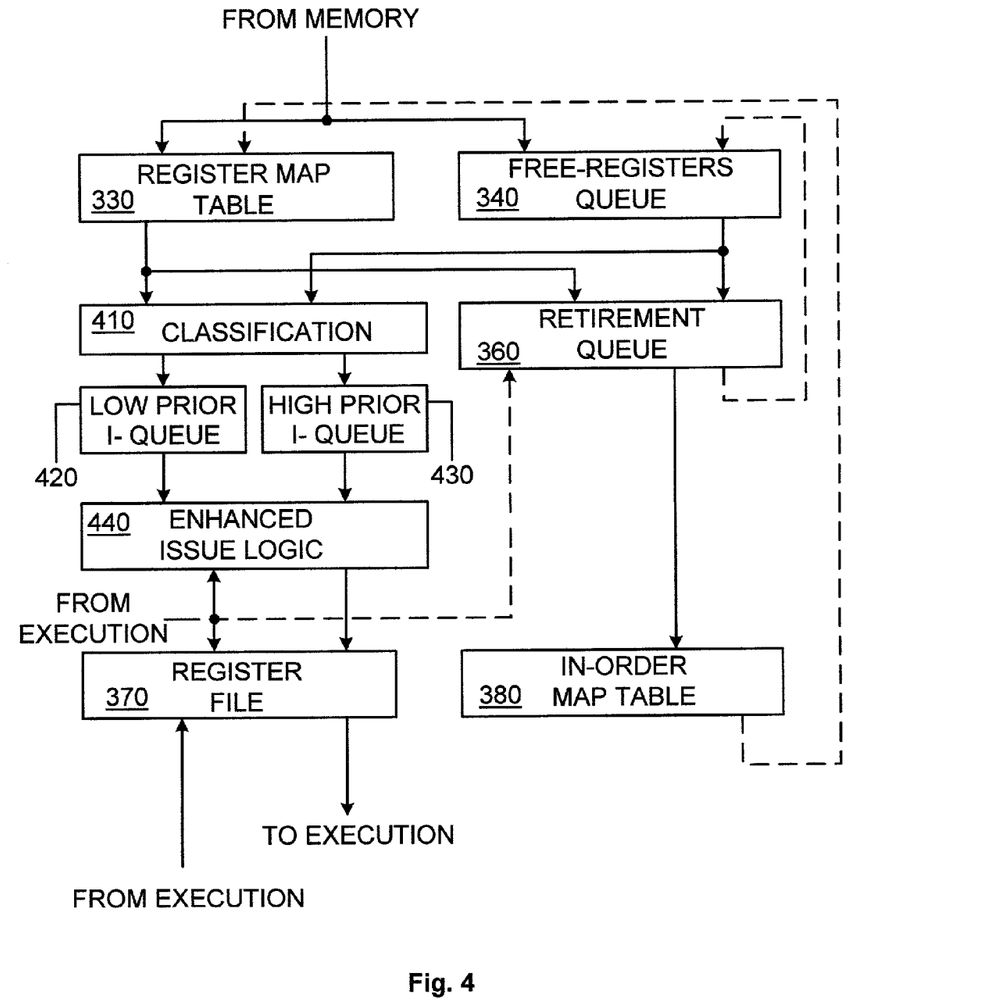
FIG. 4. Shows an embodiment of the present invention prioritizing memory and branching instructions in the instruction issuing portion of an out-of-order issue processor.

FIG. 4. shows an embodiment of the present invention prioritizing memory and branching instructions in the instruction issuing portion of the just described out-of-order issue processor. The instruction queue and issue logic block 300, of the prior art apparatus is replaced by the classification block, or logic, 410, and two instructions queues a low priority 420 and a second high-priority queue 430. Again, the number of queues with differing priorities is not limited to 2. The prior art issue logic in 300 is replaced with the enhanced issue logic 440.

The classification logic 410 can operate in accordance with FIG. 1, or FIG. 2. In one embodiment high or low priority determination is based on whether the instruction is part of the dependence graph (or, backward slice) of a performance degrading instruction, such as a memory access with high miss rate or a branch with poor predictability.

Enhanced issue logic 440 selects instructions to be issued (dispatched) in accordance with the priorities from at least a first high priority issue queue 430, a second lower-priority queue 420 and issued them to one or more of the functional units.

As recited earlier, it should be clear to those skilled in the art that this embodiment can be combined with predictive techniques in the same manner as in the earlier recited embodiments.

Figure 5:
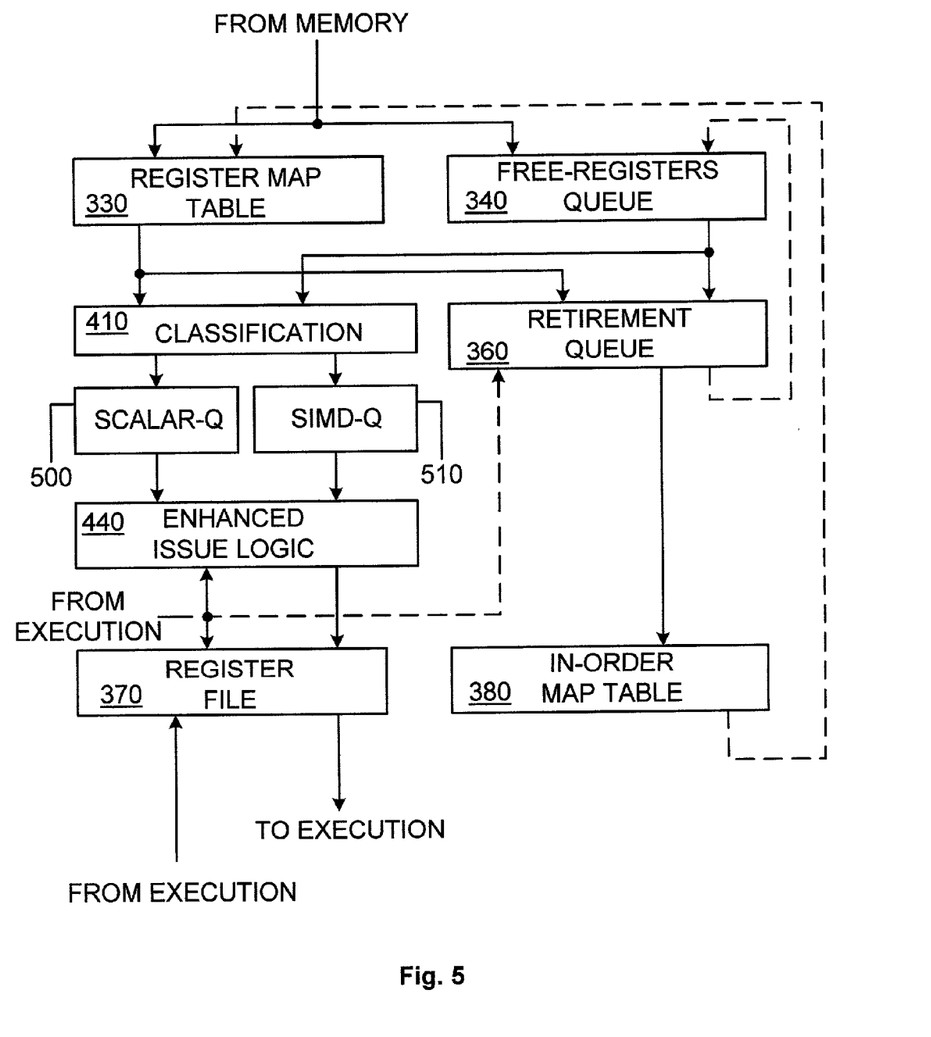
FIG. 5. Shows an embodiment of the present invention prioritizing scalar and vector instructions in the instruction issuing portion of an out-of-order issue processor.

FIG. 5. Shows an embodiment of the present invention prioritizing scalar and vector instructions in the instruction issuing portion of an out-of-order issue processor. The processor's prior art portion operation is the same as recited in relation with FIG. 3 and FIG. 4. This embodiment has a second high priority issue queue 510 containing multimedia-vector (SIMD) operations. The instruction queue and issue logic block 300, of the prior art apparatus is replaced by the classification block, or logic, 410, a multimedia-vector (SIMD) issue queue 510 and enhanced issue, or dispatch, logic 440. The classification block 410 operates in accordance with FIG. 1, or FIG. 2, instructions being classified as being either scalar operations or SIMD operations, and stored accordingly in either low priority scalar queue 500, or high priority SIMD queue 510. Issue logic 440 selects instructions to be issued (dispatched) in accordance issuing policy, issuing either a single SIMD instruction to four substantially similar functional units from SIMD issue queue 510, or up to four scalar operations to a collection of these functional units.

It should be obvious to those skilled in the art that issuing a single SIMD floating point operation to four floating point functional units can be combined with issuing up to four integer scalar operations to integer functional units. It should also be obvious to those skilled in the art that while this embodiment has been described in terms of two issue queues, any number of issue queues may be used to establish finer grained control.

As recited earlier, it should be clear to those skilled in the art that this embodiment can be combined with predictive techniques in the same manner as in the earlier recited embodiments.

Furthermore, it should also be obvious to those skilled in the art that while the exemplary embodiments described herein have been described separately, several of the embodiment aspects can be combined, e.g., with a processor performing prefetch from a second issue queue, pre-executing the backward-slices of performance degrading events from a third issue queue, and executing SIMD operations from a fourth issue queue. It should be obvious to those skilled in the art that performance degrading events should refer to any execution sequence which could be performed faster, with lower power, less execution resources, or any other desirable property.

This invention is implemented in a variety of processors. As such, both hardware and software implementations are under the directions of programs. Such programs reside in storage devices, they are readable by a machine, and they tangibly embody instructions executable by the machine to perform the method steps for issuing instructions of this inventions.

Many modifications and variations of the present invention are possible in light of the above teachings, and could be apparent for those skilled in the art. The scope of the invention is defined by the appended claims.

We claim:

1. In a processor, an apparatus for issuing instructions, wherein said processor has a memory, a decoding unit, and an execution unit, said apparatus comprising:
   a classification logic adapted for prioritizing instructions in relation to one another and sorting said instructions in a number of priority categories, wherein said instructions come from said memory and are being decoded in said decoding unit prior to reaching said classification logic, and wherein said instructions sorted in said number of priority categories by said classification logic comprise cloned instructions;
   a plurality of instruction queues, wherein said queues contain said instructions in decoded form, wherein said plurality of said queues matches said number of said priority categories, and wherein each of said queues adapted to receive only one of said priority categories of said instructions from said classification logic, whereby said queues having same priority categories as said instructions, and wherein said cloned instructions and corresponding unmodified instructions from which said cloned instructions have been derived are found in different ones of said queues; and
   an issue logic to dispatch said instructions for execution in said execution unit of said processor, wherein said issue logic is operably coupled to said plurality of instruction queues and is selecting from which of said queues to dispatch said instructions for execution, wherein said issue logic has been designed to be cognizant of said priority categories of said queues.

2. The apparatus for issuing instructions of claim 1, wherein said apparatus forms part of an in-order instruction issue processor architecture.

3. The apparatus for issuing instructions of claim 1, wherein said apparatus forms part of an out-of-order instruction issue processor architecture.

4. The apparatus for issuing instructions of claim 1, wherein said plurality of instruction queues consist of two queues, a high priority queue and a low priority queue.

5. The apparatus for issuing instructions of claim 1, wherein said prioritizing of said instructions is based on said instructions being scalar instructions or vector instructions.

6. The apparatus for issuing instructions of claim 1, wherein said prioritizing of said instructions is based on a conditionality of branching.

7. The apparatus for issuing instructions of claim 1, wherein said prioritizing of said instructions is based on a probability for memory miss.

8. The apparatus for issuing instructions of claim 1, wherein said apparatus is designed for prioritizing and issuing said instructions in a static manner.

9. The apparatus for issuing instructions of claim 1, wherein said apparatus is designed for prioritizing and issuing said instructions in a dynamic manner.

10. The apparatus for issuing instructions of claim 1, wherein said apparatus further comprising a predictor unit operably coupled to said classification logic, wherein said predictor unit identifies performance-critical instructions.

11. The apparatus for issuing instructions of claim 1, wherein said classification logic further adapted for receiving preannotated instructions, wherein said instructions have been preannotated during compilation time and said preannotations indicate said priority categories.

12. In a processor, a method for issuing instructions, comprising the steps of:
   decoding instruction coming from a memory in a decoding unit and passing said instructions to a classification logic;
   prioritizing said instructions in relation to one another in said classification logic;
   sorting said instructions in a number of priority categories by said classification logic, wherein said instructions comprise cloned instructions;
   providing a plurality of instruction queues for containing said instructions in decoded form, wherein said plurality of said queues matching said number of said priority categories, and wherein each of said queues adapted to receive only one of said priority categories of said instructions from said classification logic, whereby said queues having same priority categories as said instructions, wherein said cloned instructions and corresponding unmodified instructions from which said cloned instructions have been derived are being sorted into different ones of said queues; and
   selecting from which of said queues to dispatch said instructions for execution in an execution unit of said processor by an issue logic, wherein said issue logic is operably coupled to said plurality of instruction queues and, wherein said issue logic has been designed to be cognizant of said priority categories of said queues.

13. The method for issuing instructions of claim 12, wherein said method is being executed in an in-order instruction issue processor architecture.

14. The method for issuing instructions of claim 12, wherein said method is being executed in an out-of-order instruction issue processor architecture.

15. The method for issuing instructions of claim 12, wherein said step of providing a plurality of instruction queues consist of providing two queues, a high priority queue and a low priority queue.

16. The method for issuing instructions of claim 12, wherein said prioritizing step is performed based on said instructions being scalar instructions or vector instructions.

17. The method for issuing instructions of claim 12, wherein said prioritizing step is performed based on a conditionality of branching.

18. The method for issuing instructions of claim 12, wherein said prioritizing step is performed based on a probability for memory miss.

19. The method for issuing instructions of claim 12, wherein said prioritizing and selecting steps are performed statically.

20. The method for issuing instructions of claim 12, wherein said prioritizing and selecting steps are performed dynamically.

21. The method for issuing instructions of claim 12, further comprises identifying performance-critical instructions with a predictor unit, wherein said predictor unit is operably coupled to said classification logic.

22. The method for issuing instructions of claim 12, further comprising the step of adapting said classification logic to receive preannotated instructions, wherein said instructions have been preannotated during compilation time and said preannotations indicate said priority categories.

23. A program storage device, readable by a machine, tangibly embodying a program of instructions executable by the machine to perform method steps for issuing instructions as recited in claim 12.

* * * * *